(12) United States Patent
Kato et al.

(10) Patent No.: US 10,099,628 B2
(45) Date of Patent: Oct. 16, 2018

(54) CLIP

(71) Applicant: DAIWA KASEI KOGYO KABUSHIKI KAISHA, Okazaki-shi, Aichi-ken (JP)

(72) Inventors: Makoto Kato, Toyota (JP); Junya Ukai, Okazaki (JP); Atsutoshi Kaji, Toyota (JP)

(73) Assignee: DAIWA KASEI KOGYO KABUSHIKI KAISHA, Okazaki-shi, Aichi-ken (JP)

( * ) Notice: Subject to any disclaimer, the term of this patent is extended or adjusted under 35 U.S.C. 154(b) by 0 days.

(21) Appl. No.: 15/240,874

(22) Filed: Aug. 18, 2016

(65) Prior Publication Data
US 2017/0182949 A1 Jun. 29, 2017

(30) Foreign Application Priority Data

Dec. 24, 2015 (JP) .................................. 2015-251804

(51) Int. Cl.
| | |
|---|---|
| *B60R 11/00* | (2006.01) |
| *B60R 7/02* | (2006.01) |
| *F16B 21/08* | (2006.01) |
| *F16B 5/06* | (2006.01) |

(52) U.S. Cl.
CPC ............. *B60R 11/00* (2013.01); *B60R 7/02* (2013.01); *F16B 21/086* (2013.01); *B60R 2011/0059* (2013.01); *F16B 5/0657* (2013.01)

(58) Field of Classification Search
CPC ... B60R 7/02; B60R 11/00; B60R 2011/0059; F16B 21/086; F16B 5/0657
See application file for complete search history.

(56) References Cited

U.S. PATENT DOCUMENTS

| | | | | |
|---|---|---|---|---|
| 6,976,292 | B2* | 12/2005 | MacPherson | B60N 3/026 24/292 |
| 7,287,945 | B2* | 10/2007 | Lubera | F16B 5/065 24/295 |
| 7,419,206 | B2* | 9/2008 | Slobodecki | B60J 3/0217 24/289 |
| 7,753,402 | B2* | 7/2010 | Volkmann | B60R 21/213 24/295 |
| 7,874,775 | B2* | 1/2011 | Hullmann | B60R 11/00 24/295 |

(Continued)

FOREIGN PATENT DOCUMENTS

JP 5558322 B2 6/2014

*Primary Examiner* — Robert Sandy
*Assistant Examiner* — Louis A Mercado
(74) *Attorney, Agent, or Firm* — Christensen, Fonder, Dardi & Herbert PLLC

(57) ABSTRACT

A clip may include an anchor portion configured to be inserted into an insertion hole formed in a subject member. The anchor portion has at least a pair of pillars separated via a slot that continuously extends between distal and proximal ends of the anchor portion, flexible strips respectively connected to the pillars and configured to engage a periphery of the insertion hole, and a cap portion positioned on the distal end of the anchor portion. The pillars are configured to be flexed about proximal ends thereof in a direction in which the pillars can intersect with each other. The cap portion is formed in a distal end of one of the pillars and is configured to cover a distal end of the slot.

9 Claims, 19 Drawing Sheets

(56) References Cited

U.S. PATENT DOCUMENTS

| | | | |
|---|---|---|---|
| 8,066,316 B2 * | 11/2011 | Huelke | B60R 13/0206 |
| | | | 296/97.9 |
| 8,627,552 B2 * | 1/2014 | Smith | B60R 13/0206 |
| | | | 24/295 |
| 8,636,454 B2 * | 1/2014 | Okada | F16B 5/0642 |
| | | | 24/295 |
| 8,806,722 B2 | 8/2014 | Iwahara et al. | |
| 9,145,909 B2 * | 9/2015 | Lepper | F16B 5/0657 |
| 9,440,596 B2 * | 9/2016 | Huelke | B60N 3/026 |
| 2016/0144801 A1 * | 5/2016 | Huelke | B60N 3/026 |
| | | | 24/295 |

* cited by examiner

CLIP

BACKGROUND OF THE INVENTION

Field of the Invention

The present invention relates to a clip that is used in a vehicle in order to attach an attaching member (e.g., an overhead console) to a subject member (e.g., a body panel).

Description of Related Art

This type of clip is already known. For example, as shown in FIG. 21, a clip 110 is known. The known clip 110 includes an anchor (leg) portion 120 (an engagement portion) that is configured to be inserted into an insertion hole 132 formed in a subject member 130 (e.g., a body panel), and a connecting portion 116 (a head portion) that is capable of being connected to an attaching portion 136 of an attaching member (e.g., an overhead console). The anchor portion 120 of the clip 110 is designed in consideration of an insertion (push-in) load that is applied thereto when it is inserted into the insertion hole 132 of the subject member 130 and a retention force (an engagement force to the insertion hole) that is required for the anchor 120 (the clip) after it is fully inserted into the insertion hole 132. Conversely, the connecting portion 116 of the clip 110 is formed or shaped in consideration of a type and a shape of attaching portion 136 of the attaching member. Further, the anchor portion 120 includes a pair of (two) pillars 122 that are integrated with the connecting portion and separated via a slot 121 that continuously extends between distal and proximal ends of the anchor portion 120, and a pair of (two) flexible strips 128 that are respectively connected to distal ends of the pillars 122. The pillars 122 are positioned so as to flex inward without interfering with each other. Further, the flexible strips 128 are respectively shaped to be outwardly obliquely spread toward proximal ends of the pillars 122.

In order to attach the attaching member (the overhead console) to the subject member 130 (the body panel), the connecting portion 116 of the clip 110 is connected to the attaching portion 136 of the attaching member. Thereafter, the anchor portion 120 of the clip 110 can be pressed against the insertion hole 132 of the subject member 130 by applying a desired insertion force (load). As a result, the anchor portion 120 can be inserted into the insertion hole 132 while the flexible strips 128 are flexed inwardly. Upon insertion of the anchor portion 120, the flexible strips 128 can engage a periphery of the insertion hole 132, so that the anchor portion 120 can be retained in the insertion hole 132 with a desired retention force. Thus, the clip 110 can be attached to the subject member 130. As a result, the attaching member can be attached to the subject member 130 via the clip 110.

To the contrary, in order to remove or detach the attaching member from the subject member 130 for maintenance or other such purposes, the anchor portion 120 (the clip 110) is applied with a removal or extraction force greater than the retention force thereof. Upon application of the extraction force, the extraction force can be transmitted to the pillars 122 via the flexible strips 128, so that the pillars 122 can be pressed inwardly. As a result, the flexible strips 128 can be disengaged from the periphery of the insertion hole 132, so that the anchor portion 120 (the clip 110) can be removed from the subject member 130. Thus, the attaching member can be removed from the subject member 130.

According to the clip 110 thus constructed, when the attaching member is removed from the subject member 130, the anchor portion 120 can be extracted from the insertion hole 132 after the flexible strips 128 are disengaged from the periphery of the insertion hole 132. As a result, when the anchor portion 120 is extracted from the insertion hole 132, the flexible strips 128 of the anchor portion 120 can be effectively prevented from being abraded or worn away. Therefore, the removed clip 110 can be used repeatedly.

However, as shown in FIG. 22, the anchor portion 120 of the clip 110 may be pressed against the insertion hole 132 of the subject member 130 while the anchor portion 120 is not aligned with the insertion hole 132. In such a case, the distal end (a leading end) of the anchor portion 120 may contact the periphery of the insertion hole 132. As a result, the anchor portion 120 can be prevented from being inserted into the insertion hole 132. At this time, the periphery of the insertion hole 132 may enter the slot 121 formed in the anchor portion 120, so that the pillars 122 can be excessively spread by the periphery of the insertion hole 132. As a result, the pillars 122 can be broken, so that the clip 110 can be damaged. The damaged clip 110 cannot be used again.

Thus, there is a need in the art for improved clips.

Further, another known clip of this type is taught by, for example, Japanese Patent No. 5558322.

SUMMARY OF THE INVENTION

For example, in one aspect of the present invention, a clip may include an anchor portion configured to be inserted into an insertion hole formed in a subject member. The anchor portion has at least a pair of pillars separated via a slot that continuously extends between distal and proximal ends of the anchor portion, flexible strips respectively connected to the pillars and configured to engage a periphery of the insertion hole, and a cap portion positioned on the distal end of the anchor portion. The pillars are configured to be flexed about proximal ends thereof in a direction in which the pillars can intersect with each other. The cap portion is formed in a distal end of one of the pillars and is configured to cover a distal end of the slot.

According to this aspect, when the anchor portion of the clip is pressed against the insertion hole of the subject member while the anchor portion is not aligned with the insertion hole, the distal end of the anchor portion may contact a periphery of the insertion hole. However, the anchor portion may have the cap portion that is formed in the distal end of one of the pillars and is configured to cover the distal end of the slot. Therefore, the periphery of the insertion hole may be effectively prevented from entering the distal end of the slot due to the presence of the cap portion. Thus, the pillars can be effectively prevented from being broken. As a result, the clip can be effectively prevented from being damaged.

Other objects, features and advantages of the present invention will be readily understood after reading the following detailed description together with the accompanying drawings and the claims.

DETAILED DESCRIPTION OF THE INVENTION

Detailed representative embodiments of the present invention are shown in FIGS. 1 to 19.

First Embodiment

A first detailed representative embodiment of the present invention will be described with reference to FIGS. 1 to 11. A representative clip 10 may be used in order to attach an overhead consol (an attaching member) to a body panel 30 (a subject member). Further, a plurality of clips other than the clip 10 may generally be used in order to attach the overhead consol to the body panel 30. However, only the clip 10 (one of the clips) will be described in this description because all of the clips including the clip 10 may respectively have the same structure.

Figure 1:
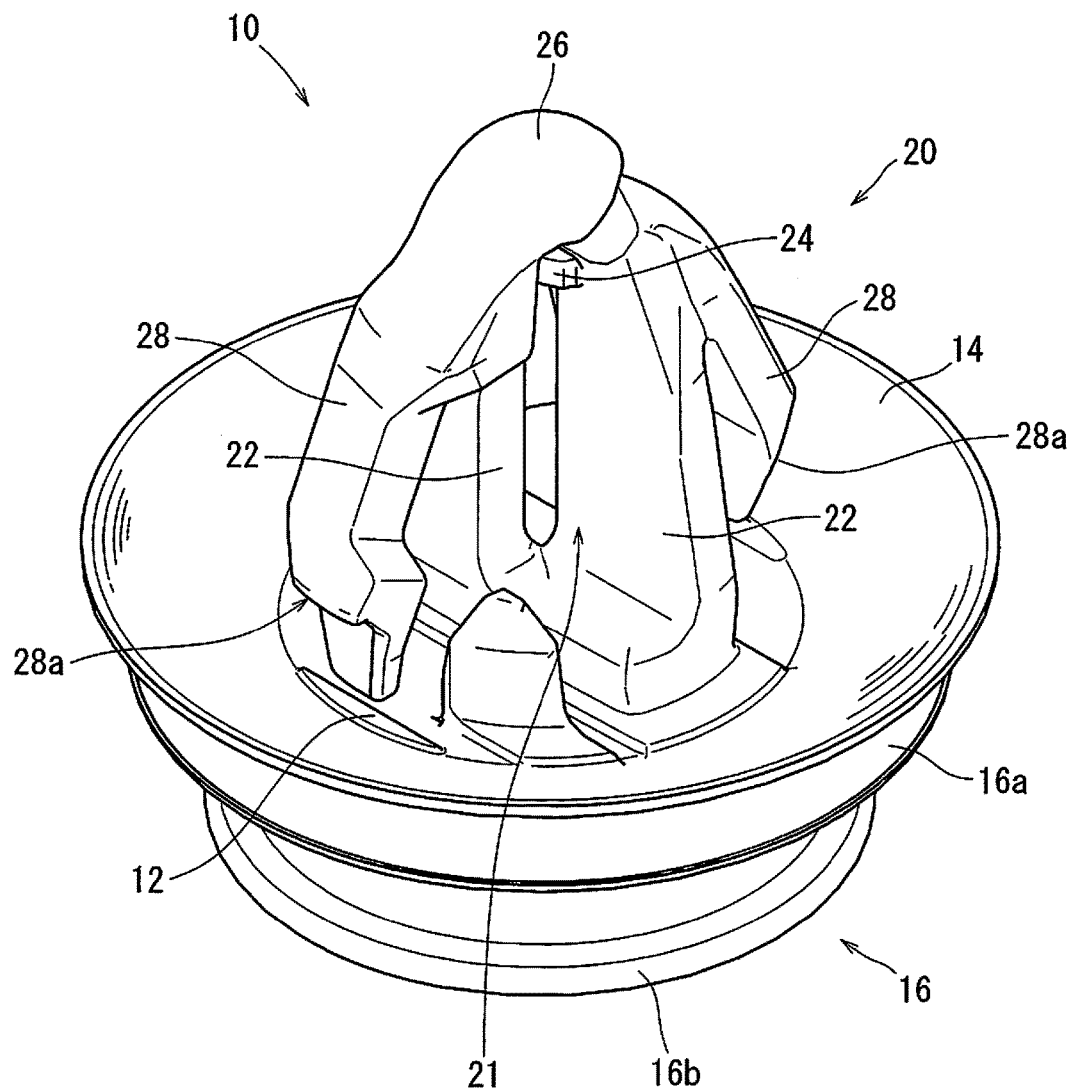
FIG. 1 is a perspective view of a clip according to a first embodiment of the present invention.

As shown in FIG. 1, the clip 10 may preferably include a central base portion 12, a lower connecting portion 16 that is extended downwardly from a lower surface of the base portion 12, and an upper anchor portion 20 that is projected upwardly from an upper surface of the base portion 12. Further, the clip 10 may preferably be a one piece plastic molded article that is integrally formed.

Figure 7:
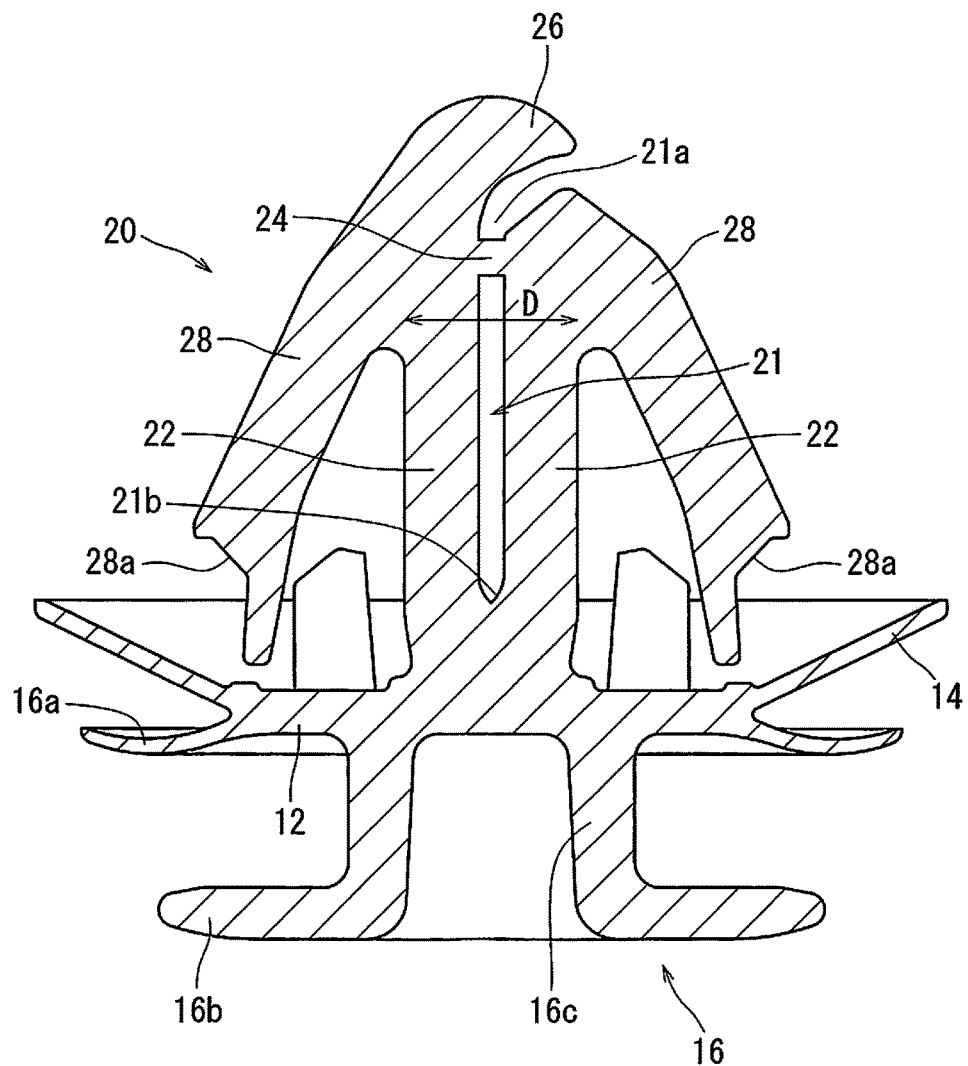
FIG. 7 is a cross-sectional view taken along line VII-VII of FIG. 4.
Figure 9:
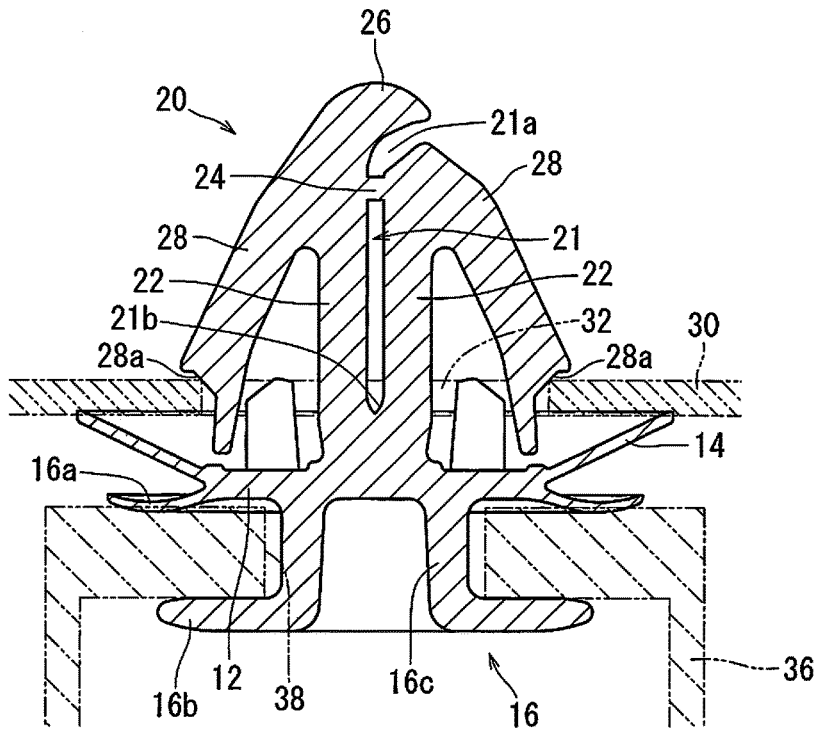
FIG. 9 is a vertical cross-sectional view of the clip, which view illustrates a coupled condition in which the anchor portion of the clip is completely inserted into the attaching hole.

As shown in FIG. 7, the base portion 12 has an annular elastically deformable portion or stabilizer 14 that is formed in a circumferential periphery thereof. Further, as shown in FIG. 9, the stabilizer 14 may function to stabilize the clip 10 on the body panel 30.

As shown in FIGS. 8 to 11, the connecting portion 16 may be used to connect or attach the clip 10 to an attaching portion 36 of the overhead consol. The connecting portion 16 may preferably include an upper (first) annular flange 16a, a lower (second) annular flange 16b, and a circular cylindrical neck portion 16c. The neck portion 16c is positioned between the upper and lower flanges 16a and 16b and has a reduced diameter substantially corresponding to a diameter of an open-sided engagement slot or hole 38 formed in the attaching portion 36 of the overhead consol. The connecting portion 16 thus constructed can be connected to the overhead consol while the attaching portion 36 of the overhead consol is clamped between the upper flange 16a and the lower flange 16b thereof via the open-sided attachment hole 38. Further, the upper flange 16a may function to stabilize the clip 10 on the attaching portion 36 of the overhead consol.

The anchor portion 20 may be projected upwardly from a central portion of the base portion 12. The anchor portion 20 may be configured to be inserted into an insertion hole 32 formed in the body panel 30. Upon insertion of the anchor portion 20 into the insertion hole 32, the anchor portion 20 can be retained in the insertion hole 32, so that the clip 10 can be attached to the body panel 30 (FIG. 9). As a result, the attaching portion 36 of the overhead consol can be connected to the body panel 30 via the clip 10.

As shown in FIG. 1, the anchor portion 20 may preferably include a pair of (two) pillars 22 positioned on the base portion 12 and diametrically separated via a slot 21 that continuously extends between distal and proximal ends of the anchor portion 20, a pair of (two) flexible strips 28 respectively connected to the pillars 22, and a cap portion 26 positioned on the distal end of the anchor portion 20.

Figure 2:
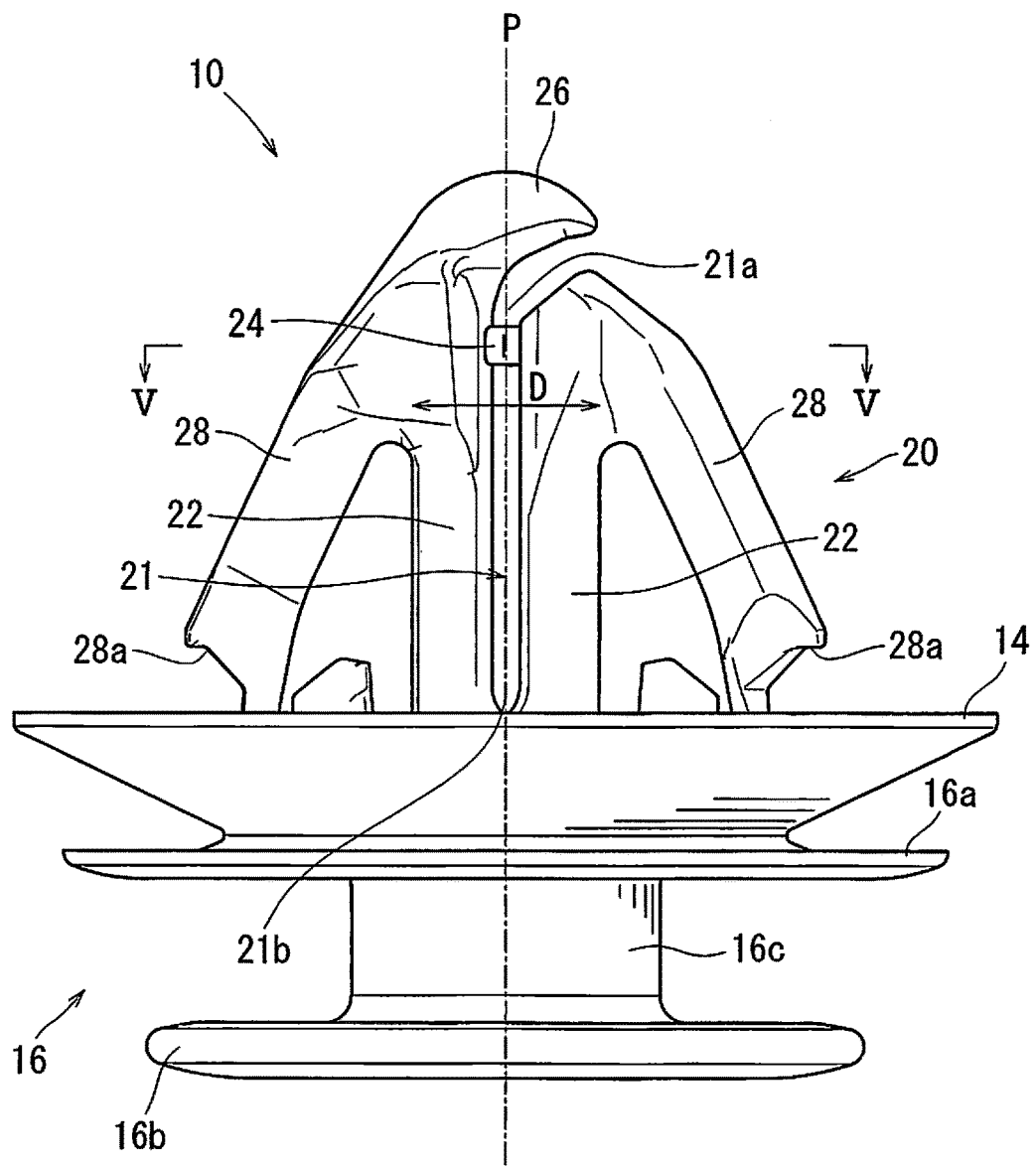
FIG. 2 is an elevational view of the clip.
Figure 3:
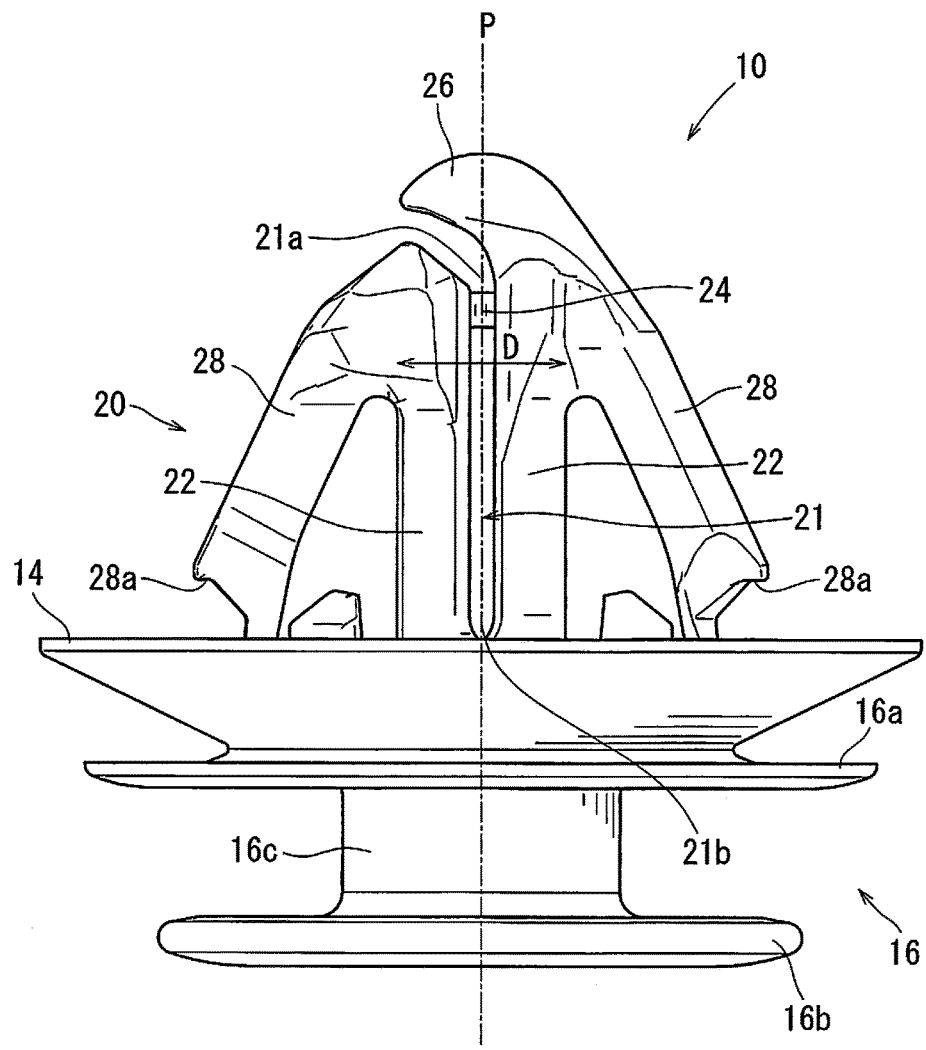
FIG. 3 is a rear elevational view of the clip.

As shown in FIGS. 2 and 3, the slot 21 may have an open distal end 21a corresponding to the distal end of the anchor portion 20 and a closed proximal end 21b corresponding to the proximal end of the anchor portion 20.

Figure 4:
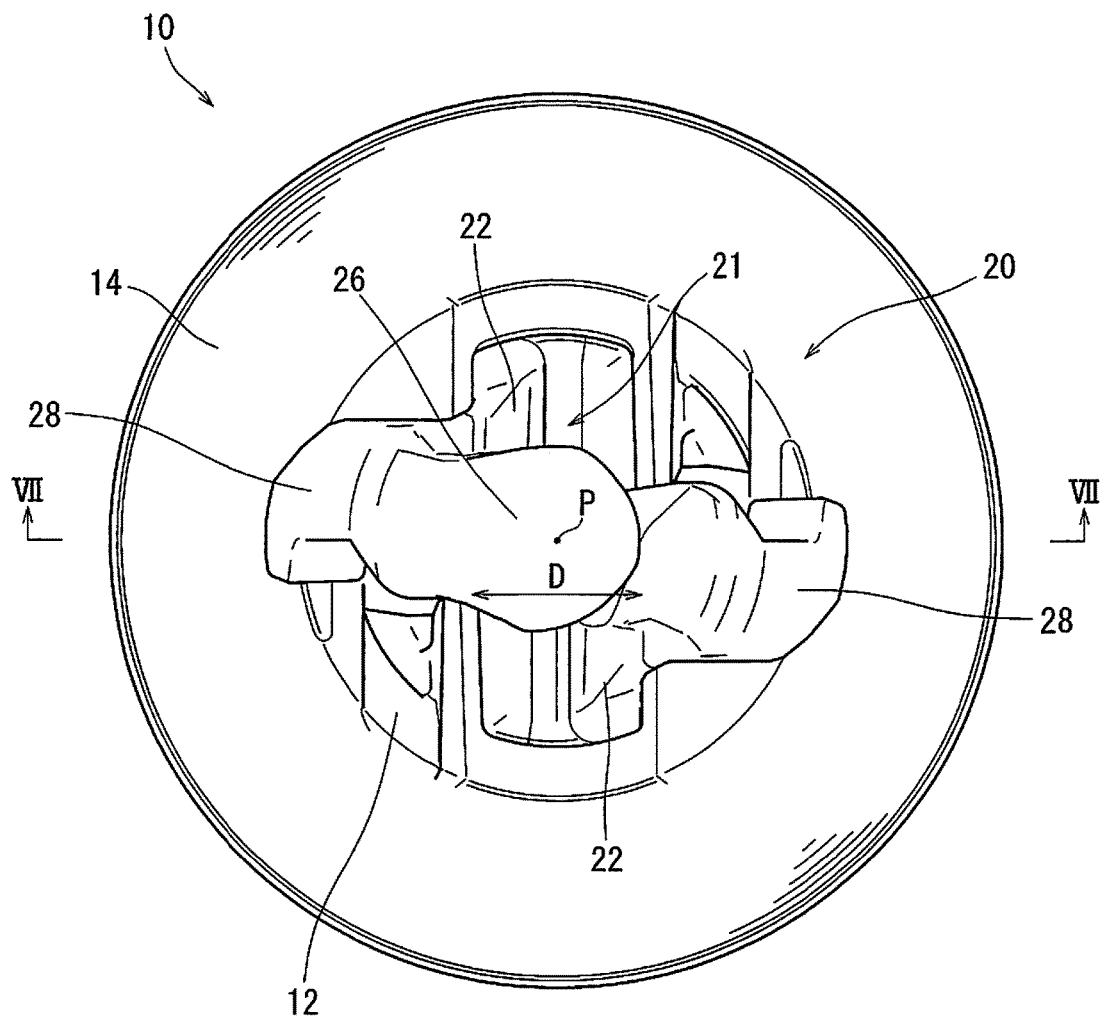
FIG. 4 is a plan view of the clip.
Figure 5:
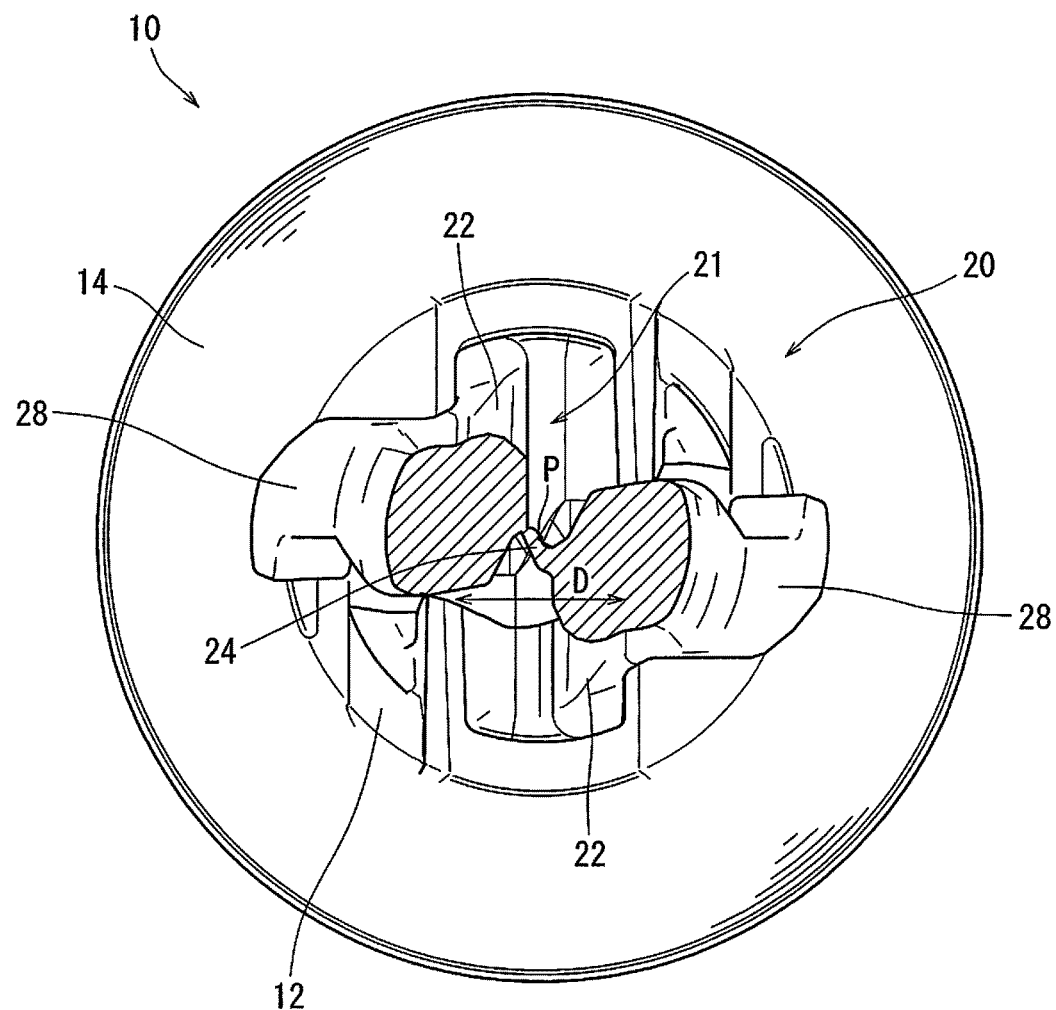
FIG. 5 is a cross-sectional view taken along line V-V of FIG. 2.
Figure 6:
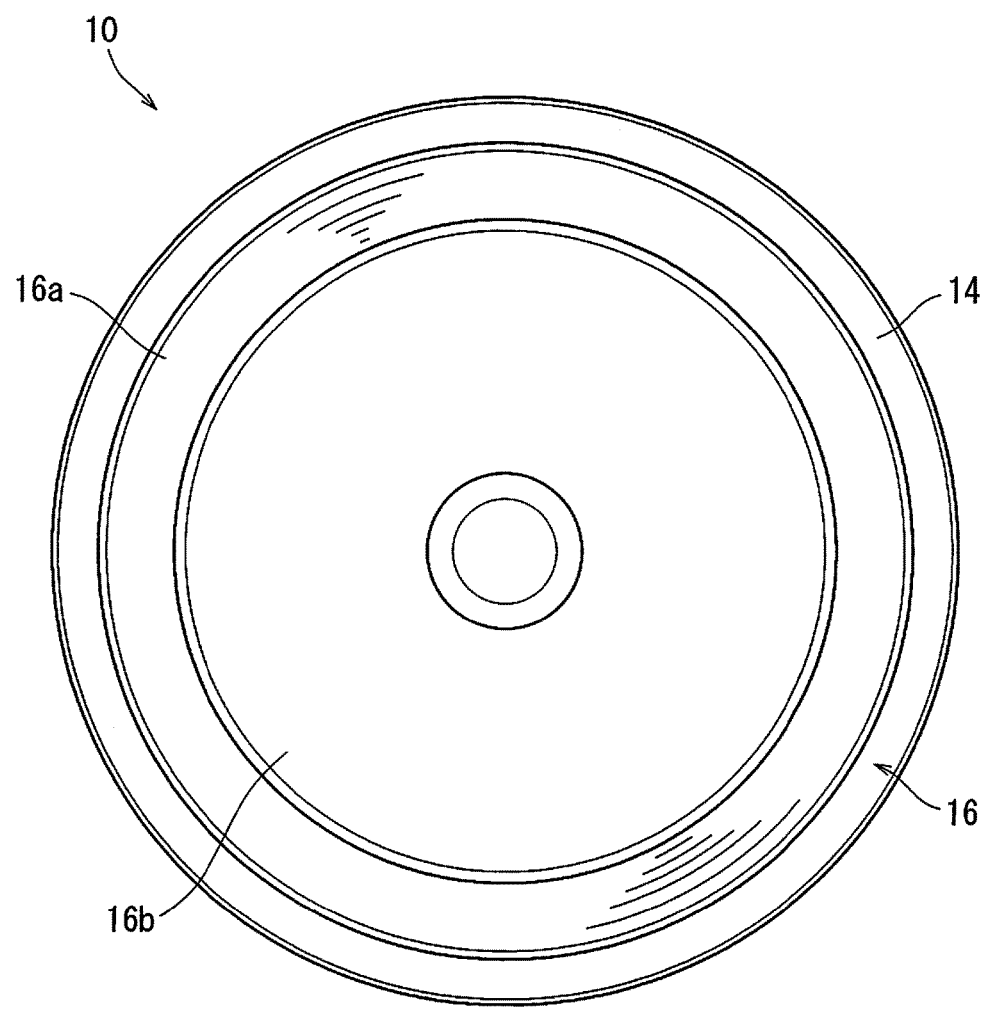
FIG. 6 is a bottom view of the clip.

As shown in FIGS. 1-3 and 7, the pillars 22 (which may be referred to as first and second pillars 22) may respectively have (upper) distal ends or free ends corresponding to the distal end of the anchor portion 20, and (lower) proximal ends corresponding to the proximal end of the anchor portion 20. The proximal ends of the pillars 22 may be integrated with the base portion 12. As shown in FIGS. 4 and 5, the pillars 22 may be positioned on the base portion 12 in a staggered arrangement in plan. In other words, the pillars 22 are positioned symmetrical about an axis P of the anchor portion 20 with a certain space therebetween in plan. Further, the pillars 22 may be shaped to be flexed about the proximal ends thereof in a predetermined diametrical direction D of the anchor portion 20 (a direction in which the pillars 22 can intersect with each other). Therefore, the pillars 22 can be flexed about the proximal ends thereof in the direction in which the pillars 22 can intersect with each other substantially without interfering with each other (FIGS. 10 and 11) when the pillars 22 are pressed inwardly (i.e., when the pillars 22 are applied with a pressing force.) That is, the pillars 22 can be flexed in the predetermined diametrical direction D of the anchor portion 20 while intersecting with each other when the pillars 22 are pressed inwardly.

Further, as shown in FIGS. 1-3 and 5, the distal ends of the pillars 22 may be connected to each other via a connecting strip 24 (a connecting portion) positioned on the open distal end 21a of the slot 21 such that the pillars 22 can be normally prevented from being flexed in the predetermined diametrical direction D of the anchor portion 20. In particular, the connecting strip 24 may be positioned between the distal ends of the pillars 22, so that the distal ends of the pillars 22 are connected to each other in a horizontal direction substantially parallel to the stabilizer 14 (the base portion 12). However, as shown in FIG. 5, the connecting strip 24 may have a cross-sectional shape that allows the connecting strip 24 to be relatively easily broken when a predetermined force is applied thereto via the pillars 22. Therefore, when the pillars 22 are pressed inwardly, the connecting strip 24 may be broken, so that the pillars 22 can be flexed in the predetermined diametrical direction D of the anchor portion 20.

As shown in FIGS. 2 and 3, the cap portion 26 may be integrally formed in the distal end of one of the pillars 22. Further, the cap portion 26 may be configured to cover the distal end 21a of the slot 21. In particular, the cap portion 26 may extend from the distal end of one of the pillars 22 beyond the distal end 21a of the slot 21 so as to overhang the distal end of the other of the pillars 22. Therefore, the cap portion 26 may function to prevent a periphery of the insertion hole 32 of the body panel 30 from entering the distal end 21a of the slot 21 when the anchor portion 20 is pressed toward the insertion hole 32 of the body panel 30. Further, as will be apparent from FIGS. 2 and 3, the cap portion 26 formed in the distal end of one of the pillars 22 may overhang the distal end of the other of the pillars 22 with a predetermined space therebetween. Therefore, the cap portion 26 may not prevent the pillars 22 from being flexed about the proximal ends thereof when the pillars 22 are pressed inwardly. Further, the cap portion 26 may preferably have a rounded (top) outer surface.

Conversely, as shown in FIGS. 2, 3 and 7, the flexible strips 28 may respectively be connected to the distal ends of the pillars 22. In particular, the flexible strips 28 may respectively be projected obliquely downward and outward from the distal ends of the pillars 22 in the predetermined diametrical direction D of the anchor portion 20. That is, the flexible strips 28 may respectively be formed as cantilevered strips each of which has a proximal end integrated with the distal end of the pillar 22 and a distal end (a free end). Therefore, each of the flexible strips 28 can flex inward and outward about the proximal end thereof in the predetermined diametrical direction D of the anchor portion 20. Further, each of the flexible strips 28 may have an engagement surface (portion) 28a that is formed in the free end thereof. The engagement surface 28a of each of the flexible strips 28 may be configured to engage the periphery of the insertion hole 32 formed in the body panel 30 when the anchor portion 20 is inserted into the insertion hole 32 (FIG. 9).

Figure 8:
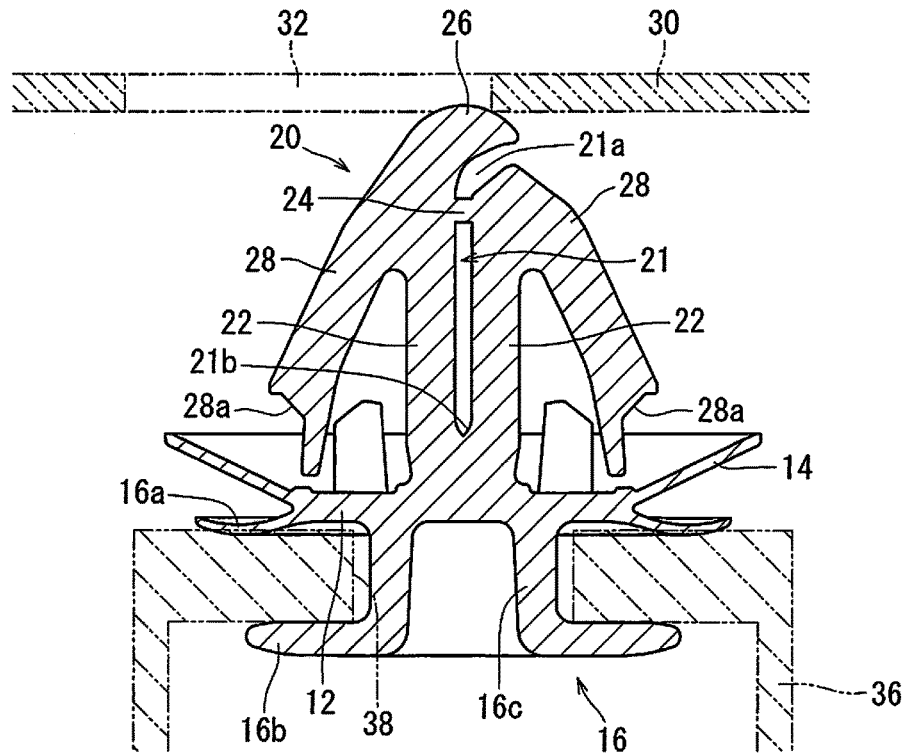
FIG. 8 is a vertical cross-sectional view of the clip, which view illustrates a condition immediately before an anchor portion of the clip is inserted into an attaching hole while the anchor portion is not aligned with the insertion hole.

Next, a method of using the clip 10 will now be described in detail. First, in order to attach the overhead consol (the attaching member) to the body panel 30 (the subject member), the connecting portion 16 of the clip 10 may be connected to the attaching portion 36 of the overhead consol, so as to attach the clip 10 to the overhead consol (FIG. 8). Subsequently, the anchor portion 20 of the clip 10 may be pressed against and inserted into the insertion hole 32 formed in the body panel 30. Upon insertion of the anchor portion 20, the anchor portion 20 may pass through the insertion hole 32 while the flexible strips 28 are respectively flexed inward about the proximal end thereof. When the anchor portion 20 is completely inserted into the insertion hole 32 (a coupled condition of the clip 10), the flexible strips 28 of the anchor portion 20 may respectively be restored outward, so that the engagement surfaces 28a of the flexible strips 28 can engage the periphery of the insertion hole 32 (FIG. 9). Thus, the anchor portion 20 (the clip 10) can be attached to the body panel 30 with a desired retention force. As a result, the overhead consol can be attached to the body panel 30 via the clip 10.

Figure 10:
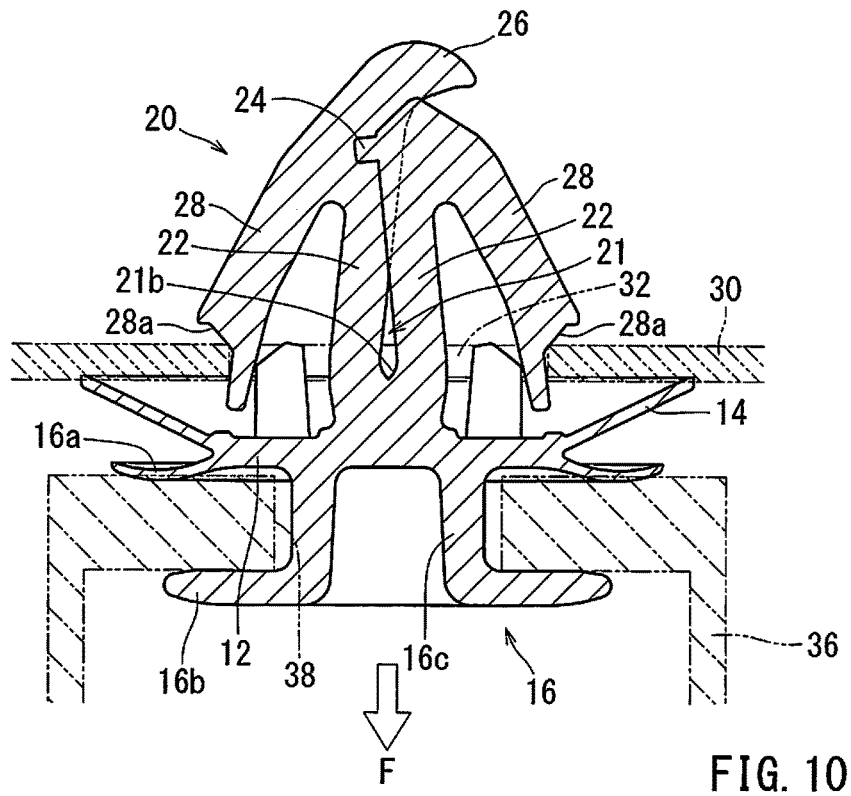
FIG. 10 is a vertical cross-sectional view of the clip, which view illustrates an initial condition of an extraction process in which the anchor portion of the clip is extracted from the attaching hole.

To the contrary, in order to detach the overhead consol from the body panel 30, in the coupled condition of the clip 10, i.e., in a condition in which the clip 10 is attached to the body panel 30 (FIG. 9), the anchor portion 20 (the clip 10) can be applied with a removal or extraction force F greater than the retention force thereof (FIG. 10). Upon application of the extraction force F to the anchor portion 20, the extraction force F can be transmitted to the pillars 22 via the flexible strips 28, so that the pillars 22 (the distal ends) can be pressed inwardly (i.e., the pillars 22 can be applied with a flexing force). As a result, as shown in FIG. 10, the pillars 22 may start to be flexed inward in the predetermined diametrical direction D of the anchor portion 20 while the connecting strip 24 connecting the distal ends of the pillars 22 can be broken.

Figure 11:
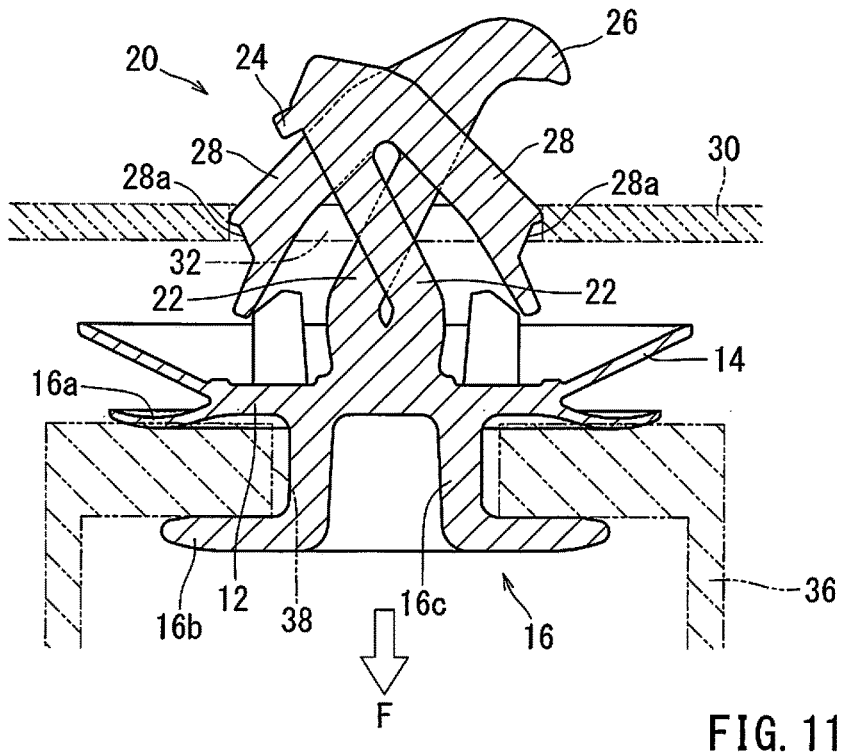
FIG. 11 is a vertical cross-sectional view of the clip, which view illustrates a final condition of the extraction process in which the anchor portion of the clip is extracted from the attaching hole.
Figure 12:
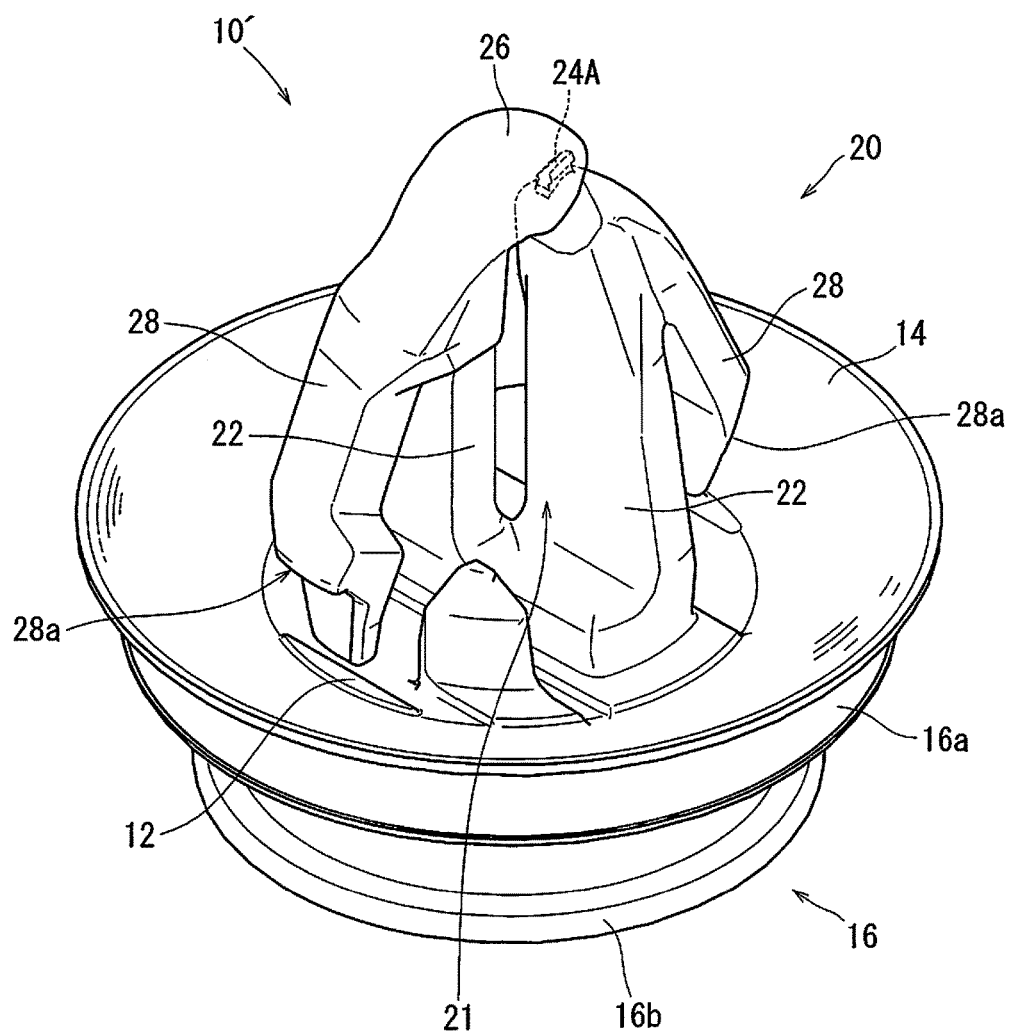
FIG. 12 is a perspective view of a clip according to a second embodiment of the present invention.

Subsequently, as shown in FIG. 11, when the extraction force F is continuously applied to the anchor portion 20 (i.e., when the flexing force is continuously applied to the pillars 22), the pillars 22 can be further flexed inwardly in the predetermined diametrical direction D of the anchor portion 20 while intersecting with each other. As a result, the engagement surfaces 28a of the flexible strips 28 can be disengaged from the periphery (or a burr formed in the periphery) of the insertion hole 32 of the body panel 30. Thus, the anchor portion 20 (the clip 10) can be smoothly removed from the insertion hole 32 of the body panel 30.

As shown in FIG. 8, when the anchor portion 20 of the clip 10 is pressed against the insertion hole 32 of the body panel 30 while the anchor portion 20 is not aligned with the insertion hole 32, the distal end (a leading end) of the anchor portion 20 may contact the periphery of the insertion hole 32. However, according to the clip 10 thus constructed, the anchor portion 20 may have the cap portion 26 positioned on the distal end thereof. As described above, the cap portion 26 may be integrated with the distal end of one of the pillars 22 and is shaped to cover the distal end 21a of the slot 21 formed in the anchor portion 20. Therefore, the periphery of the insertion hole 32 of the body panel 30 may be effectively prevented from entering the distal end 21a of the slot 21 due to the presence of the cap portion 26. Thus, the pillars 22 can be effectively prevented from being broken. As a result, the clip 10 can be effectively prevented from being damaged. In addition, the cap portion 26 may effectively function as a guide member to direct the anchor portion 20 toward the insertion hole 32 due to the rounded outer surface thereof. Therefore, the anchor portion 20 can be relatively easily and smoothly inserted into the insertion hole 32 even when the anchor portion 20 is pressed against the insertion hole 32 while the anchor portion 20 is not aligned with the insertion hole 32.

Generally, in order to press the anchor portion 20 of the clip 10 against the insertion hole 32 formed in the body panel 30, an end portion of the overhead consol to which the clip 10 is attached is hooked on the body panel 30. Thereafter, the overhead consol may be rotated about the end portion thereof such that the anchor portion 20 of the clip 10 may be moved toward the insertion hole 32 formed in the body panel 30. This means that the anchor portion 20 may be pressed against the insertion hole 32 while rotating along a curve trajectory. As a result, when the anchor portion 20 is pressed against the insertion hole 32, the anchor portion 20 can be displaced from and inclined with respect to the insertion hole 32. Thus, the anchor portion 20 may sometimes be pressed against the insertion hole 32 while the anchor portion 20 is not aligned with the insertion hole 32.

Further, according to the clip 10, the anchor portion 20 can be extracted from the insertion hole 32 of the body panel 30 after the engagement surfaces 28a of the flexible strips 28 are disengaged from the periphery of the insertion hole 32. That is, when the anchor portion 20 (the clip 10) is extracted from the insertion hole 32 of the body panel 30, the flexible strips 28 of the anchor portion 20 can be effectively prevented from being abraded or worn away. Therefore, the clip 10 can be repeatedly used. Further, the retention force of the anchor portion 20 cannot be changed or decreased even if the clip 10 is repeatedly used.

Second Embodiment

The second detailed representative embodiment will now be described in detail with reference to FIGS. 12 to 17. Because the second embodiment relates to the first embodiment, only the constructions and elements that are different from the first embodiment will be explained in detail.

Figure 13:
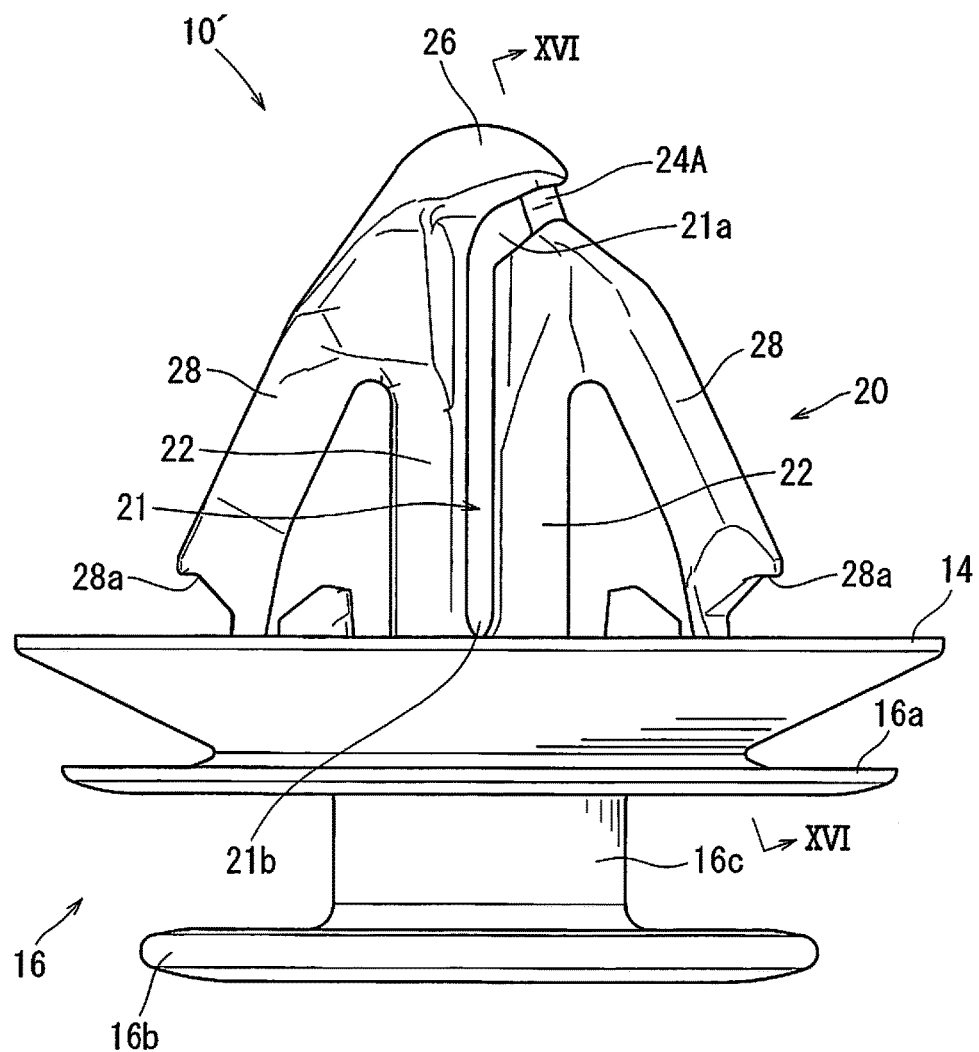
FIG. 13 is an elevational view of the clip.
Figure 14:
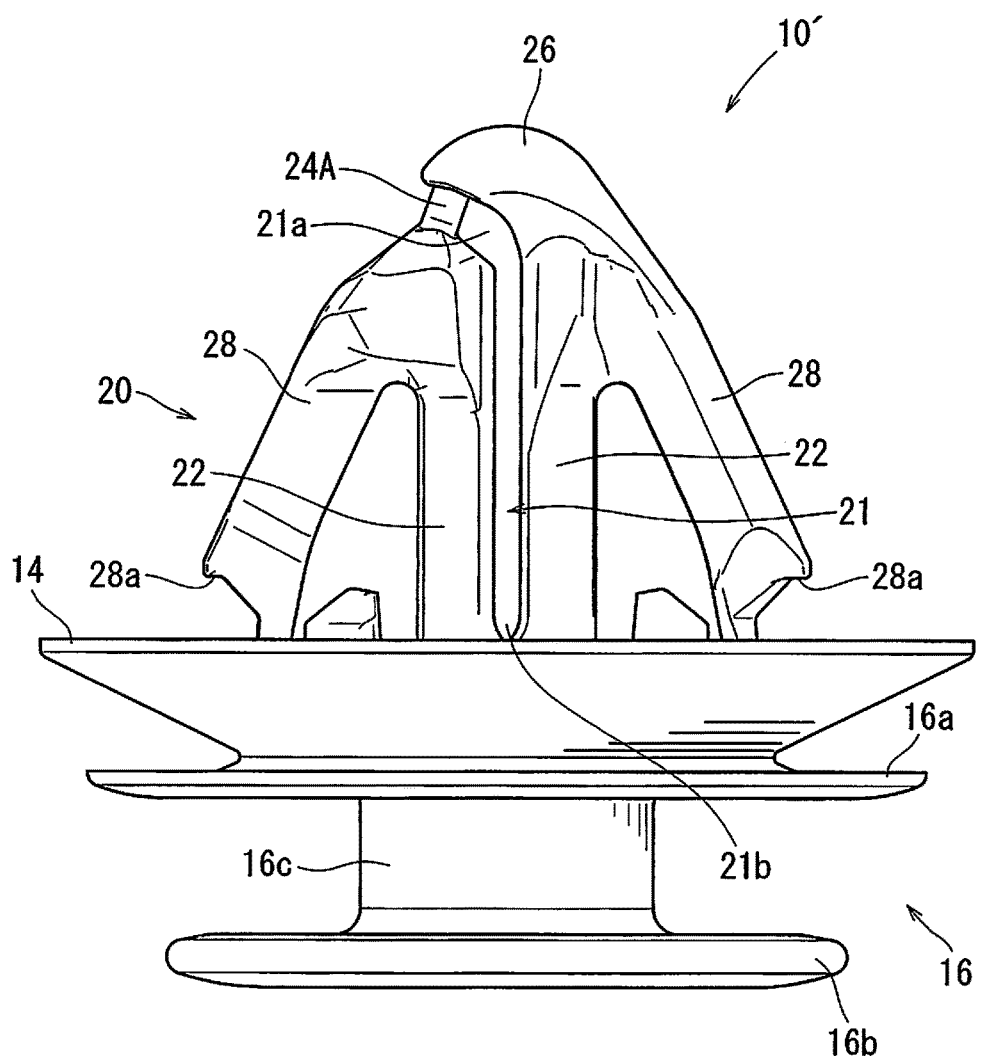
FIG. 14 is a rear elevational view of the clip.
Figure 15:
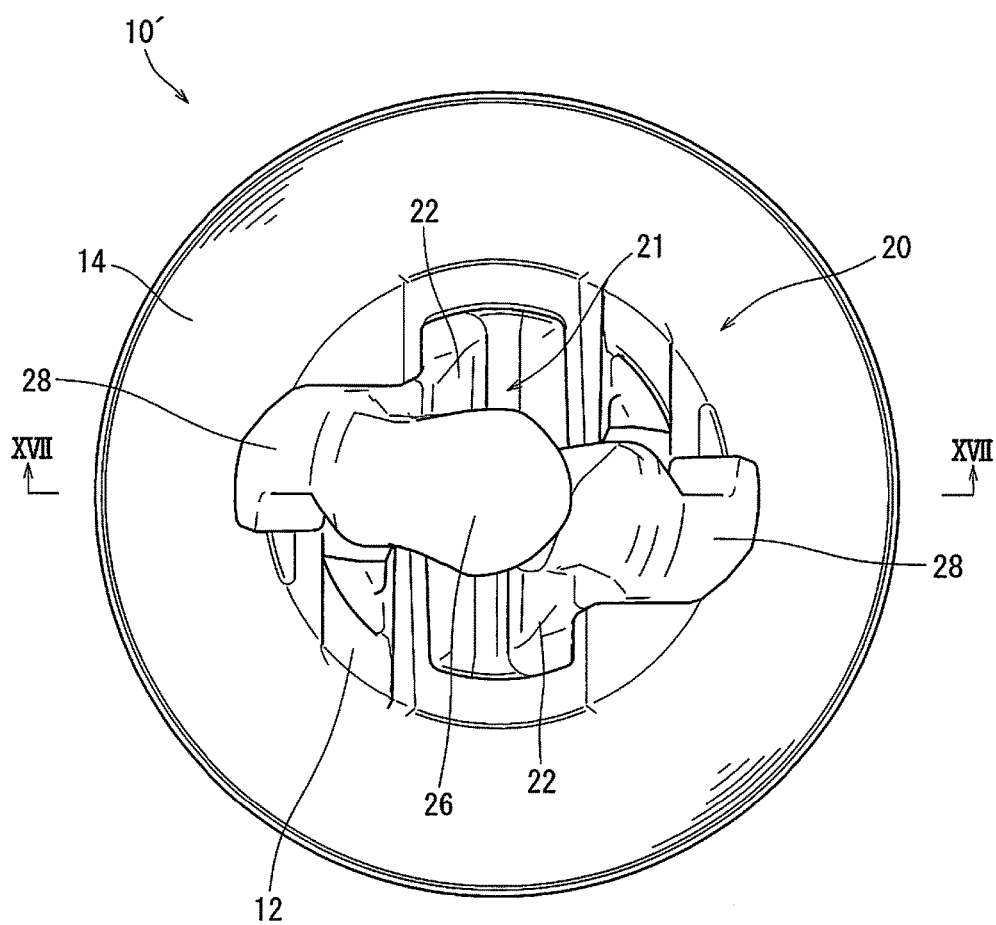
FIG. 15 is a plan view of the clip.
Figure 16:
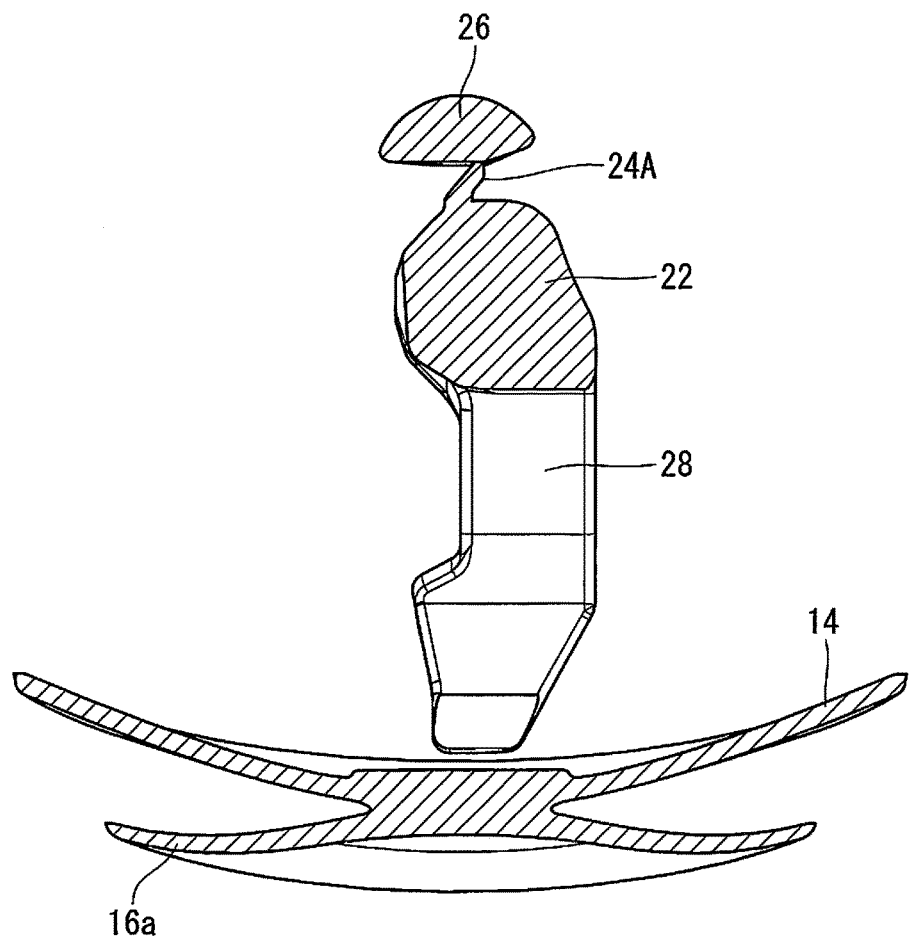
FIG. 16 is a cross-sectional view taken along line XVI-XVI of FIG. 13.
Figure 17:
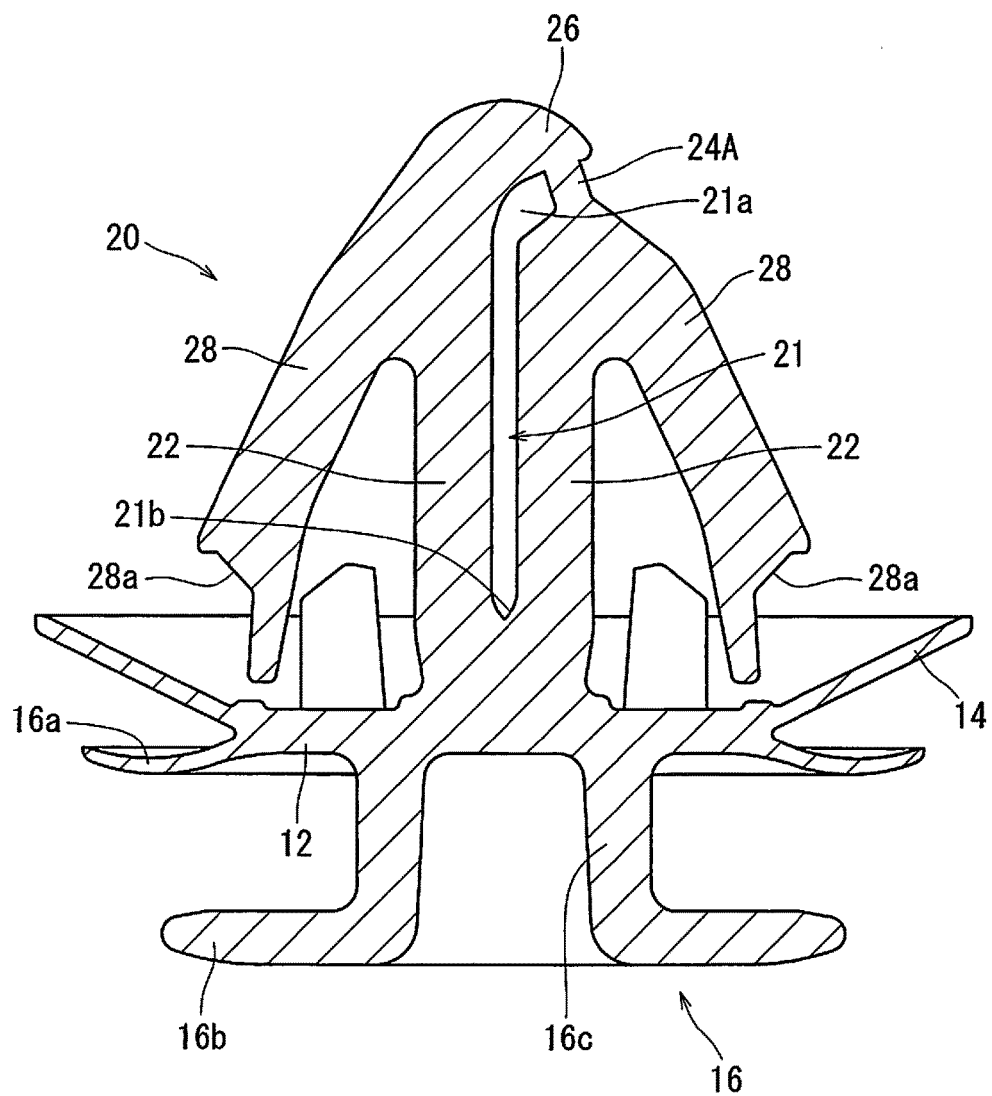
FIG. 17 is a cross-sectional view taken along line XVII-XVII of FIG. 15.

In this embodiment, a clip 10' may have the same structure as the clip 10 of the first embodiment except that a connecting strip 24A (the connecting portion) is used instead of the connecting strip 24. Similar to the first embodiment, the distal ends of the pillars 22 may be connected to each other via the connecting strip 24A. However, as best shown in FIGS. 13 and 14, unlike the first embodiment, the cap portion 26 formed in the distal end of one of the pillars 22 and the distal end of the other of the pillars 22 may be connected to each other via the connecting strip 24A. In particular, the connecting strip 24A may be positioned between a lower surface of the cap portion 26 formed in the distal end of one of the pillars 22 and the distal end of the other of the pillars 22, so that the lower surface of the cap portion 26 formed in the distal end of one of the pillars 22 can be connected to the distal end of the other of the pillars 22 in a vertical direction substantially perpendicular to the stabilizer 14 (the base portion 12). Further, as shown in FIG. 16, the connecting strip 24A may have a cross-sectional shape that allows the connecting strip 24A to be relatively easily broken when the predetermined force is applied thereto via the pillars 22.

Third Embodiment

Figure 18:
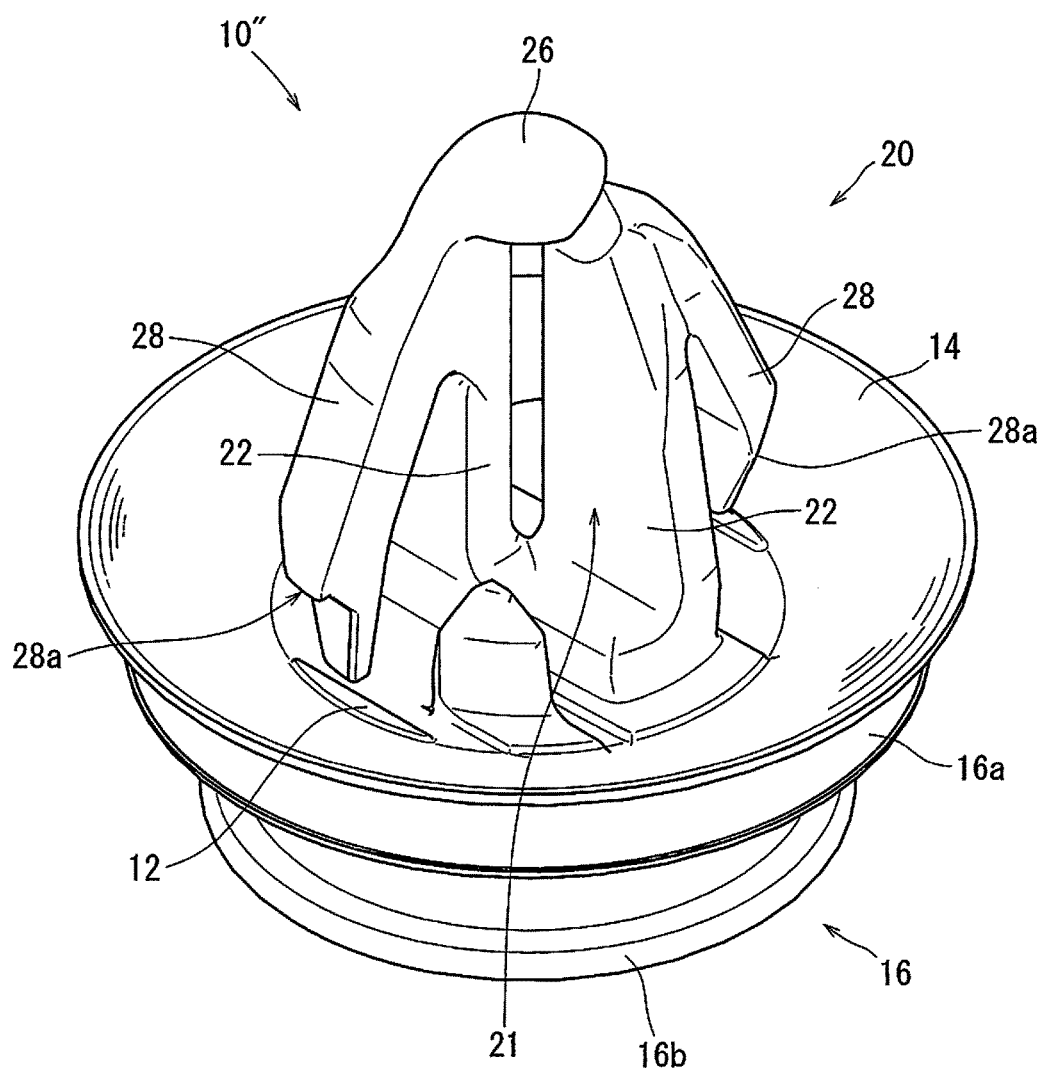
FIG. 18 is a perspective view of a clip according to a third embodiment of the present invention.
Figure 19:
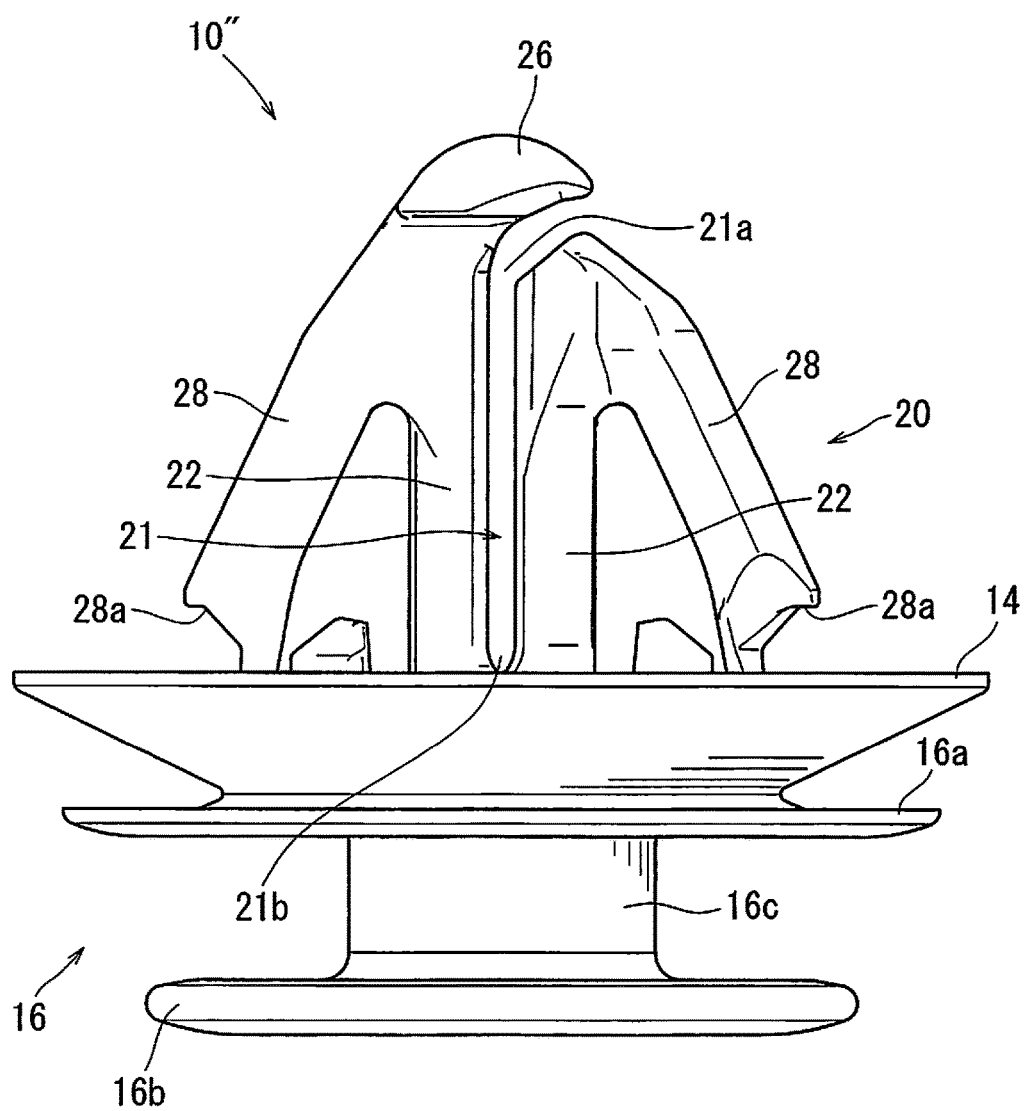
FIG. 19 is an elevational view of the clip.
Figure 20:
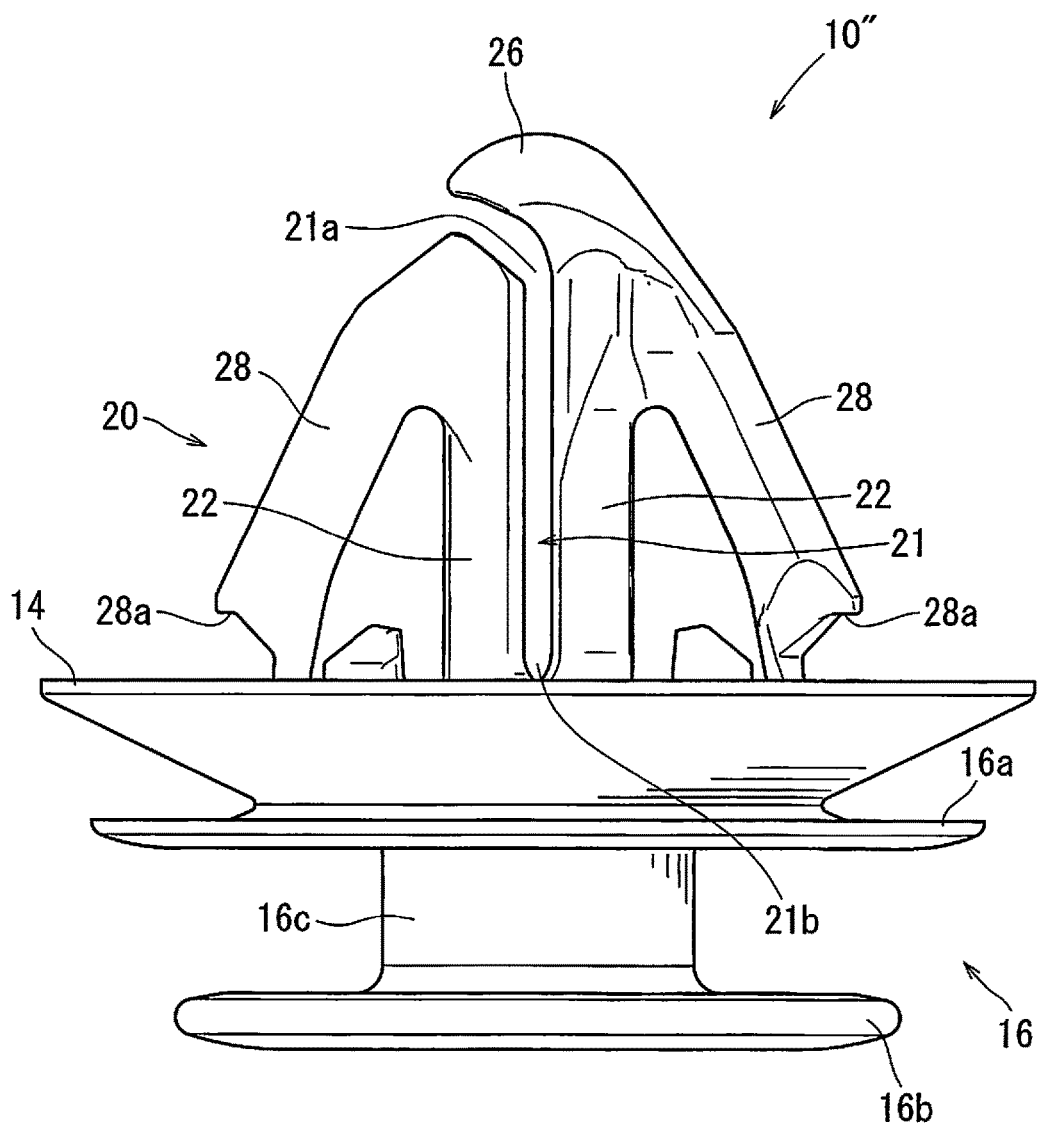
FIG. 20 is a rear elevational view of the clip.
Figure 21:
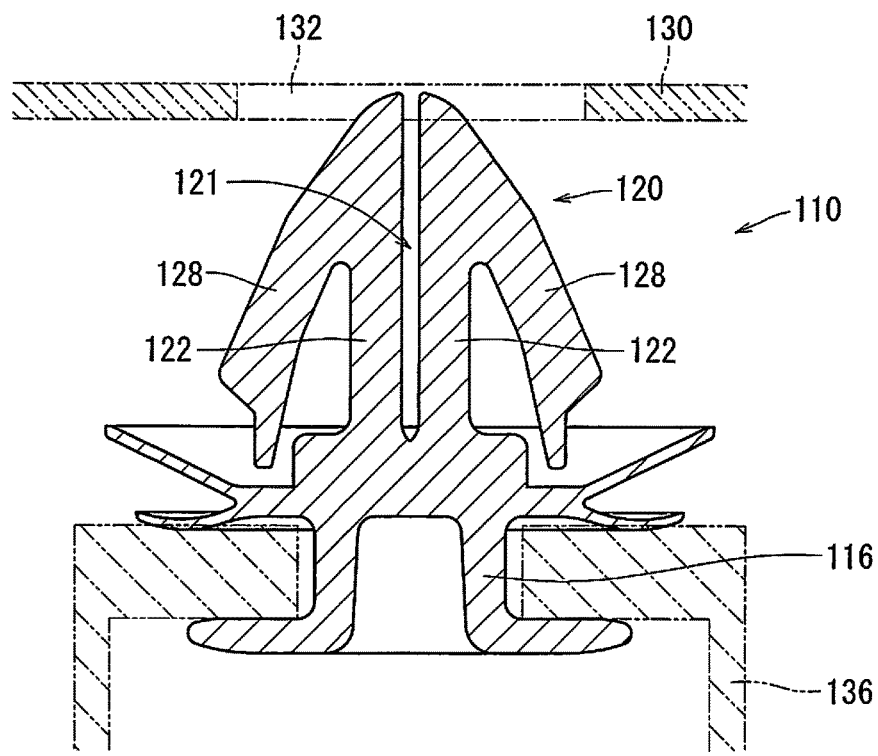
FIG. 21 is a vertical cross-sectional view of a conventional clip, which view illustrates a condition before an anchor portion of the clip is inserted into an attaching hole.
Figure 22:
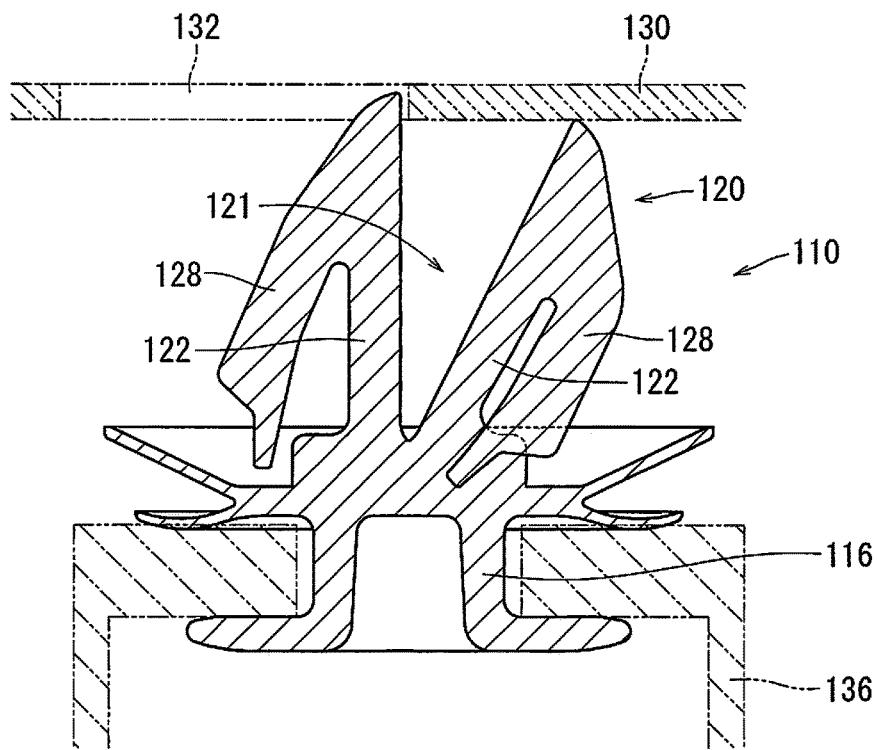
FIG. 22 is a vertical cross-sectional view of the conventional clip, which view illustrates a condition in which the anchor portion of the clip is pressed against the attaching hole while the anchor portion is not aligned with the insertion hole.

The third detailed representative embodiment will now be described in detail with reference to FIGS. 18 to 20. Because the third embodiment relates to the first embodiment, only the constructions and elements that are different from the first embodiment will be explained in detail.

In this embodiment, a clip 10" may have the same structure as the clip 10 of the first embodiment except that the connecting strip 24 (the connecting portion) is omitted. That is, unlike the first embodiment, the distal ends of the pillars 22 are not connected to each other.

Naturally, various changes and modifications may be made to the present invention without departing from the scope of the invention. For example, in the embodiments, the anchor portion 20 has the two pillars 22 (the first and second pillars 22) and the two flexible strips 28. However, the number of the pillars 22 (the flexible strips 28) is not limited to two.

Further, in the embodiments, the flexible strips 28 are respectively formed as the cantilevered strips. However, the distal ends of the flexible strips 28 can be connected to the pillars 22 or the base portion 12 as necessary. That is, the flexible strips 28 may respectively be formed as double-supported strips. Further, the flexible strips 28 can be formed as flexible members that are integrated with the pillars 22.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A clip comprising an anchor portion configured to be inserted into an insertion hole formed in a subject member,
    wherein the anchor portion has at least a pair of pillars separated via a slot that continuously extends between distal and proximal ends of the anchor portion, flexible strips respectively connected to the pillars and configured to engage a periphery of the insertion hole, and a cap portion positioned on the distal end of the anchor portion,
    wherein the pillars are configured to be flexed about proximal ends thereof in a direction in which the pillars can intersect with each other,
    wherein the pillars are positioned opposite to each other across the slot in a staggered arrangement in a flexing direction thereof, and
    wherein the cap portion is formed at the distal end of one of the pillars and extends from the distal end of the one of the pillars beyond the distal end of the slot so as to overhang the distal end of the other of the pillars.

2. The clip as defined in claim 1, wherein the cap portion overhangs the distal end of the other of the pillars leaving a predetermined space therebetween.

3. The clip as defined in claim 1 further comprising a connecting strip connecting the cap portion to the distal end of the other of the pillars.

4. The clip as defined in claim 1, wherein the cap portion has a rounded outer surface.

5. The clip as defined in claim 1, wherein the cap portion is formed at the distal end of the one of the pillars over an entire area thereof.

6. A clip comprising:
    at least a pair of pillars vertically separated from each other via a slot,
    flexible strips respectively connected to the pillars, and
    a cap portion formed at a distal end of one of the pillars,
    wherein the pillars are configured to be flexed about proximal ends thereof in a direction in which the pillars can intersect with each other,
    wherein the pillars are positioned opposite to each other across the slot in a staggered arrangement in a flexing direction thereof, and
    wherein the cap portion extends from the distal end of the one of the pillars so as to overhang the distal end of the other of the pillars.

7. The clip as defined in claim 6, wherein the cap portion is formed at the distal end of the one of the pillars over an entire area thereof.

8. A clip comprising an anchor portion configured to be inserted into an insertion hole formed in a subject member,
   wherein the anchor portion has at least a pair of pillars separated via a slot that continuously extends between distal and proximal ends of the anchor portion, flexible strips respectively connected to the pillars and configured to engage a periphery of the insertion hole, and a cap portion positioned on the distal end of the anchor portion,
   wherein the pillars are configured to be flexed about proximal ends thereof in a direction in which the pillars can intersect with each other,
   wherein the pillars are positioned opposite to each other across the slot in a staggered arrangement in a flexing direction thereof, and
   wherein the cap portion is formed at a distal end of one of the pillars and extends from the distal end of the one of the pillars beyond the distal end of the slot so as to overlap the distal end of the other of the pillars.

9. The clip as defined in claim 8, wherein the cap portion is formed at the distal end of the one of the pillars over an entire area thereof.

* * * * *